(12) United States Patent
Shiraishi

(10) Patent No.: US 11,736,628 B2
(45) Date of Patent: Aug. 22, 2023

(54) IMAGE FORMING APPARATUS EXECUTING BILLING PROCESS

(71) Applicant: KYOCERA Document Solutions Inc., Osaka (JP)

(72) Inventor: Takanori Shiraishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/954,250

(22) Filed: Sep. 27, 2022

(65) Prior Publication Data
US 2023/0096099 A1    Mar. 30, 2023

(30) Foreign Application Priority Data
Sep. 29, 2021    (JP) .................. 2021-158634

(51) Int. Cl.
*G06F 3/12*    (2006.01)
*H04N 1/00*    (2006.01)

(52) U.S. Cl.
CPC ..... *H04N 1/00143* (2013.01); *H04N 1/00803* (2013.01); *H04N 1/00824* (2013.01)

(58) Field of Classification Search
CPC ........... H04N 1/00143; H04N 1/00803; H04N 1/00824
See application file for complete search history.

(56) References Cited

U.S. PATENT DOCUMENTS

2005/0010530 A1*    1/2005    Kakutani ................ G06F 21/10
705/57

FOREIGN PATENT DOCUMENTS

| JP | 2004258961 A |   | 9/2004 |
| JP | 2006166334 A | * | 6/2006 |
| JP | 2008287418 A | * | 11/2008 |

* cited by examiner

*Primary Examiner* — Moustapha Diaby
(74) *Attorney, Agent, or Firm* — IP Business Solutions, LLC

(57) ABSTRACT

An image forming apparatus includes a reading device and a controller. The reading device reads an image of a source document, and generates image data. The controller receives an input of the image data generated by the reading device. Further, the controller decides that the source document is a chargeable item, when image information indicating that the source document is the chargeable item, for which charging a usage fee corresponding to the source document to a predetermined third party is permitted, is included in the image data.

1 Claim, 5 Drawing Sheets

IMAGE FORMING APPARATUS EXECUTING BILLING PROCESS

INCORPORATION BY REFERENCE

This application claims priority to Japanese Patent Application No. 2021-158634 filed on Sep. 29, 2021, the entire contents of which are incorporated by reference herein.

BACKGROUND

The present disclosure relates to an image forming apparatus.

Image forming apparatuses are known that charge, when a user prints a document to be used for business, outside of the company employing the user, the usage fee to the employing company instead of the user, to exempt the user from paying the fee in advance on behalf of the employing company. In the case of such an image forming apparatus, a server apparatus of a management center receives user identification information inputted from the image forming apparatus, and charges the usage fee of the image forming apparatus to the company employing the user, not to the user, according to employing company information associated with the user identification information in a user database.

SUMMARY

The disclosure proposes further improvement of the foregoing techniques.

In an aspect, the disclosure provides an image forming apparatus including a reading device and a controller. The reading device reads an image of a source document, and generates image data. The controller receives an input of the image data generated by the reading device. Further, the controller decides that the source document is a chargeable item, when image information indicating that the source document is the chargeable item, for which charging a usage fee, incurred from utilization of the source document, to a predetermined third party is permitted, is included in the image data.

DETAILED DESCRIPTION

Figure 1:
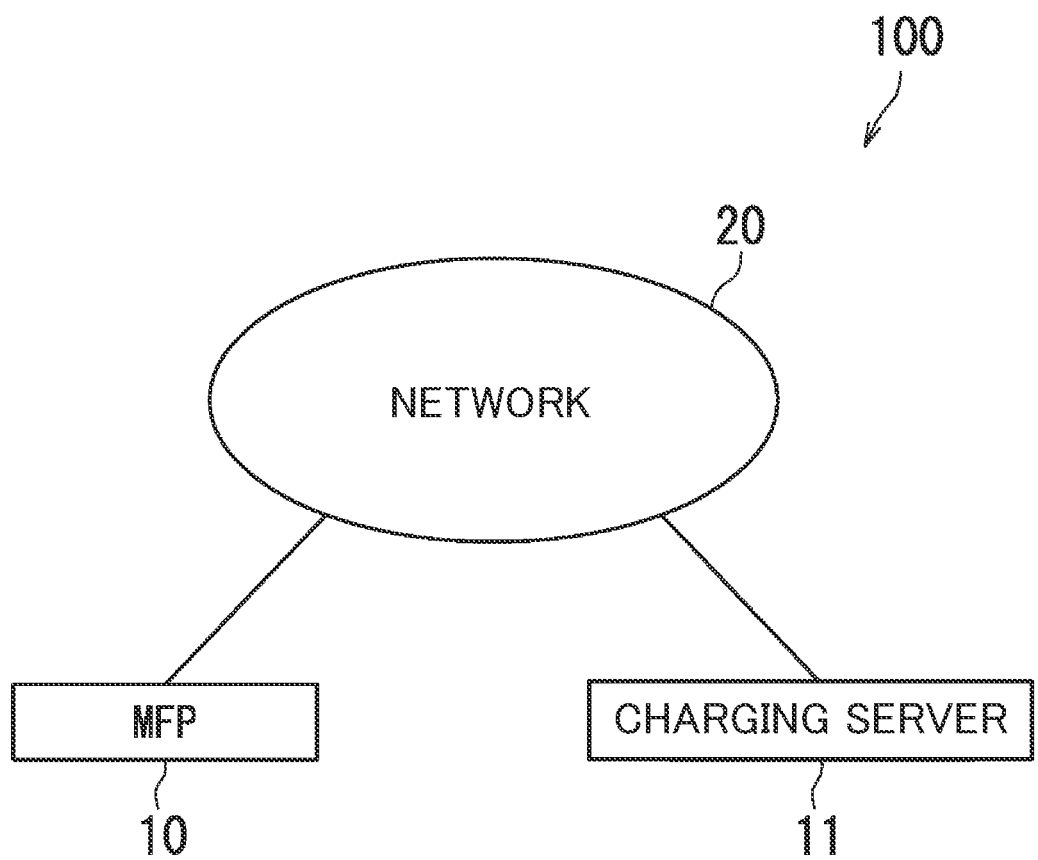
FIG. 1 is a block diagram showing an exemplary configuration of a charging system that includes an image forming apparatus.

Hereafter, an image forming apparatus according to an embodiment of the disclosure will be described, with reference to the drawings. In the drawings, the same or corresponding elements are given the same numeral, and the description of such elements will not be repeated.

Referring first to FIG. 1, a charging system 100 including an image forming apparatus according to an embodiment will be described. FIG. 1 is a block diagram showing an exemplary configuration of the charging system 100.

As shown in FIG. 1, the charging system 100 includes a multifunction peripheral (MFP) 10 and a charging server 11. The MFP 10 and the charging server 11 are communicably connected to each other, via a network 20. An example of the network 20 is the internet.

The MFP 10 has the functions of copying, scanning, printing, and facsimile transmission, and is installed, for example, in a convenience store. The MFP 10 is compatible with a telework mode, in which a user utilizes the MFP 10 for business of the company employing the user. The MFP 10 exemplifies the image forming apparatus in the disclosure.

The charging server 11 is managed by the employing company, and processes charge billing information received from the MFP 10, so as to charge the usage fee of the MFP 10 for business, to the employing company. The charging server 11 manages, for example, information of a spending limit of each of the employees.

Figure 2:
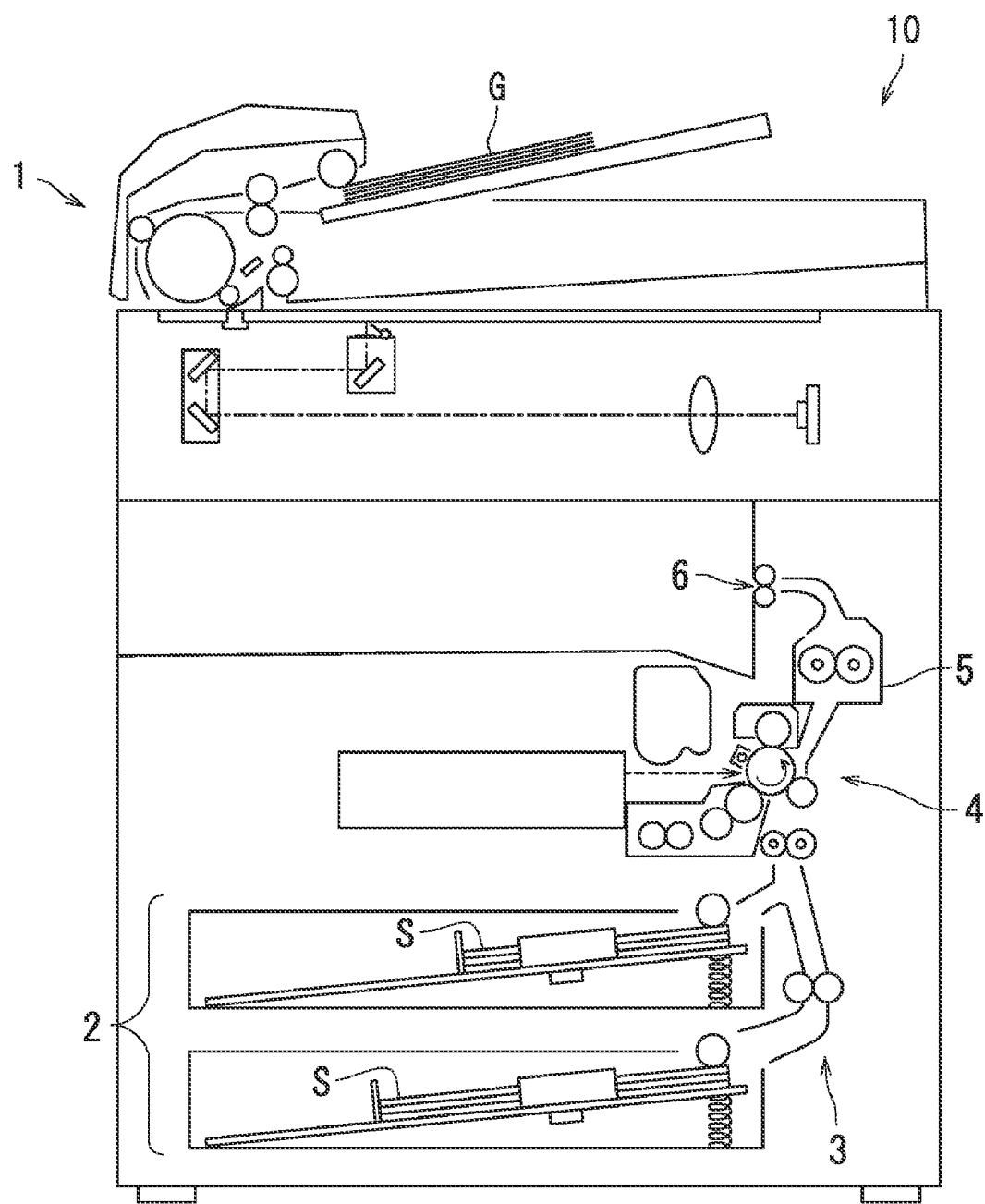
FIG. 2 is a schematic cross-sectional view showing an exemplary structure of the image forming apparatus.

Referring to FIG. 1 and FIG. 2, a structure of the MFP 10 will be described hereunder. FIG. 2 is a schematic cross-sectional view showing an exemplary structure of the MFP 10.

As shown in FIG. 2, the MFP 10 includes a reading device 1, a feeding device 2, a transport device 3, an image forming device 4, a fixing device 5, and a delivery device 6.

The reading device 1 includes an image reading mechanism such as a scanner or a CCD, to read the image of a source document G. The reading device 1 generates image data, from the image that has been read. The feeding device 2 accommodates therein a plurality of sheets S, and feeds the sheet S to the transport device 3. The sheet S is, for example, formed of paper or a synthetic resin. The transport device 3 includes a plurality of transport roller pairs, to transport the sheet S to the image forming device 4. The sheet S exemplifies the recording medium in the disclosure.

The image forming device 4 forms a toner image on the sheet S, through an electrophotography process. The image forming device 4 includes a photoconductor drum, a charging device, an exposure device, a developing device, a supply device, a transfer device, a cleaning device, and a static neutralizer. The toner image represents, for example, the image of the source document G. The fixing device 5 heats and presses the sheet S to which the toner image has been transferred, to thereby fix the toner image onto the sheet S. The transport device 3 transports the sheet S onto which the toner image has been fixed, to the delivery device 6 having a delivery roller pair. The delivery device 6 delivers the sheet S, to an output tray of the MFP 10.

Figure 3:
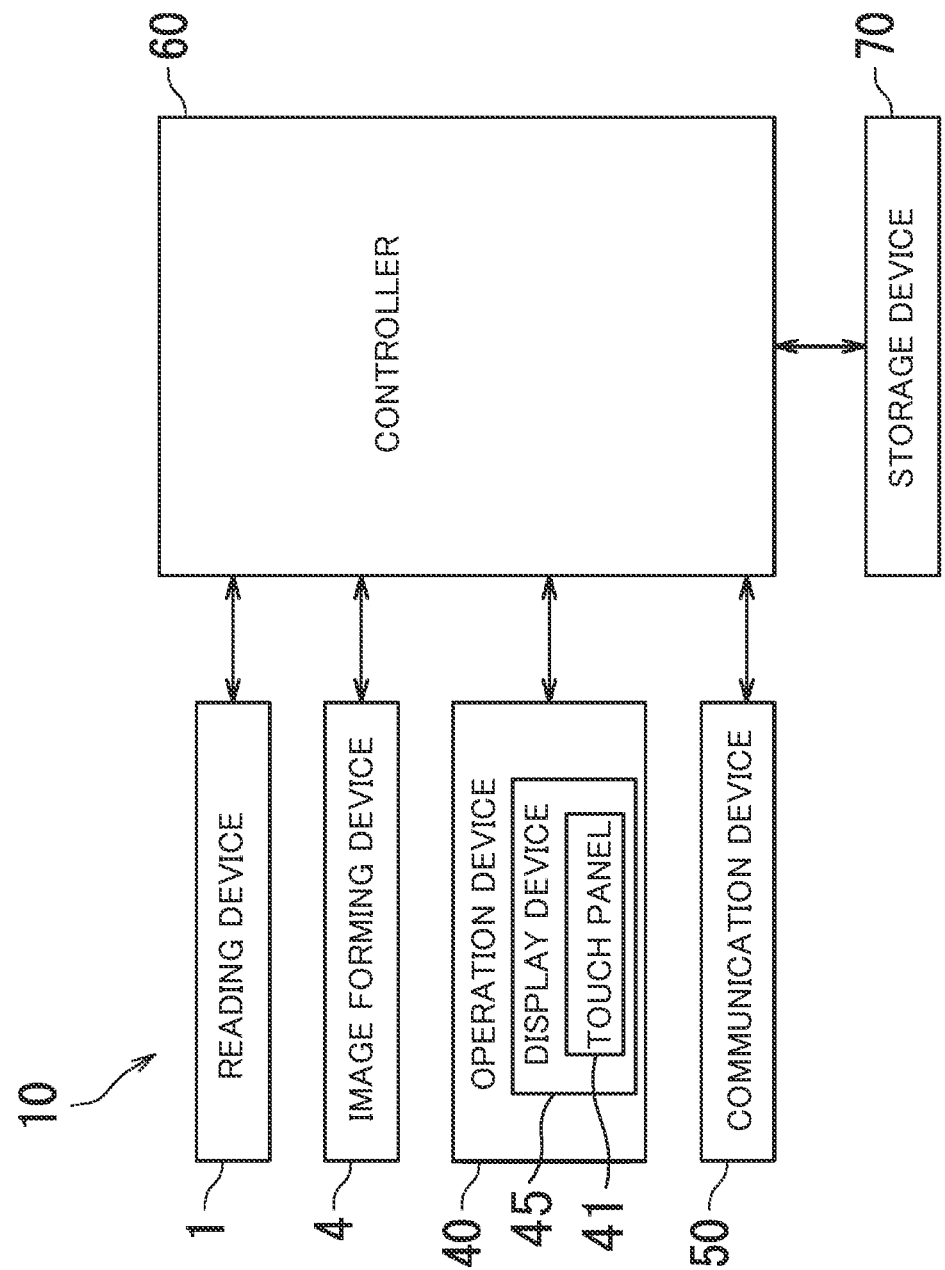
FIG. 3 is a block diagram showing an exemplary configuration of the image forming apparatus.

Referring now to FIG. 1 to FIG. 3, a circuit configuration of the MFP 10 will be described hereunder. FIG. 3 is a block diagram showing an exemplary configuration of the MFP 10.

As shown in FIG. 3, the MFP 10 also includes an operation device 40, a communication device 50, a controller 60, and a storage device 70.

The operation device 40 serves as an input device, for the user to input various instructions and information. The operation device 40 includes a display device 45, for example constituted of a liquid crystal display (LCD), a touch panel 41 overlaid on the display device 45, and a plurality of buttons.

The communication device 50 is a communication interface having a communication module, and makes communication with the charging server 11, via the network 20. The controller 60 is connected to the network 20, via the communication device 50.

The storage device 70 includes a memory unit, and stores therein various types of data and computer programs. The storage device 70 includes, for example, a main memory unit such as a semiconductor memory, and an auxiliary memory unit such as a hard disk drive (HDD).

The controller 60 includes a processor such as a central processing unit (CPU). The controller 60 executes the computer programs stored in the storage device 70, so as to control the components of the MFP 10, including the reading device 1, the image forming device 4, the operation device 40, and the communication device 50. The controller 60 executes a charge processing program stored in the storage device 70, thereby executing the charge processing, depending on whether the sheet S is a chargeable item, as will be subsequently described.

The controller 60 receives the input of the image data generated by the reading device 1, and representing the source document G. When an instruction to select a copy service is inputted through the operation device 40, the controller 60 causes the image forming device 4 to form an image on the sheet S, according to the image data of the source document G generated by the reading device 1. When an instruction to select a data storage service is inputted through the operation device 40, the controller 60 stores the image data of the source document G generated by the reading device 1 in the storage device 70, as a file of a predetermined format.

Figure 4:
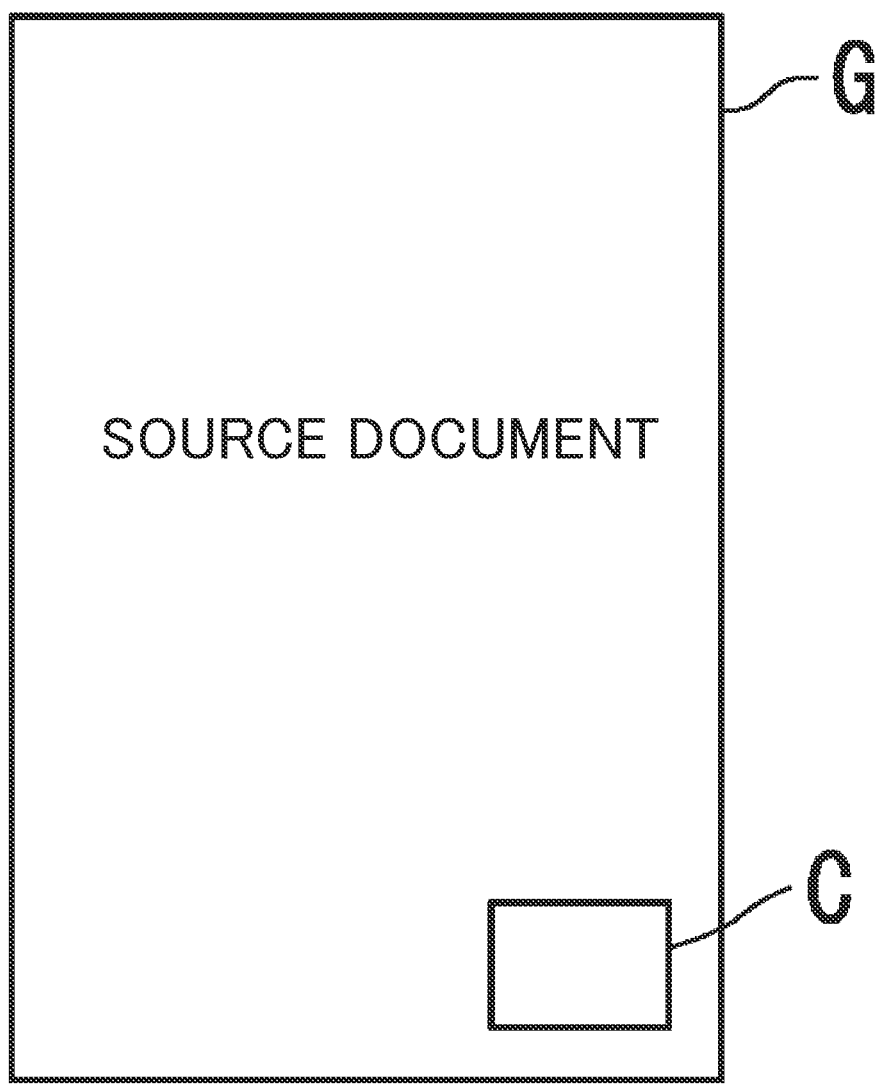
FIG. 4 is a plan view showing an example of a source document set up as a chargeable item.

Referring then to FIG. 1 to FIG. 4, image information indicating charging permission will be described hereunder. FIG. 4 is a plan view showing an example of the source document G set up as a chargeable item.

Referring to FIG. 4, a seal C is stuck to the source document G which is the chargeable item. The seal C is provided to the user of the MFP 10, for example by the employing company. A two-dimensional barcode is displayed on the surface of the seal C. The two-dimensional barcode includes the image information indicating the permission for charging. The two-dimensional barcode also includes the user information for identifying the user. Since the image data, generated by the reading device 1 upon reading the source document G, includes the user information, there is no need for the user to cause the MFP 10 to read an ID card such as an employee card. Here, the term "charging" refers to the charging of the usage fee, incurred from the use of the source document, for example to the employing company, corresponding to the predetermined third party in the disclosure.

The image information indicating the permission for charging is not limited to the two-dimensional barcode. For example, the image information indicating the permission for charging may be literal information including the company name and such letters as "permitted to print". The image information indicating the permission for charging may be figure information including an authentication logo of the company, or a combination of the literal information and the figure information. The user of the MFP 10 may create the source document G using a sheet with an invisible special image formed thereon through a ground pattern printing function, such as a ground pattern in which a watermark image is embedded. In this case, the reading device 1 reads the special image, and generates the image information indicating the permission for charging. For example, the information indicating the permission for charging may be included in the watermark image, so that the watermark image, which appears on the image when the reading device 1 reads the special image, can be utilized as the image information.

Figure 5:
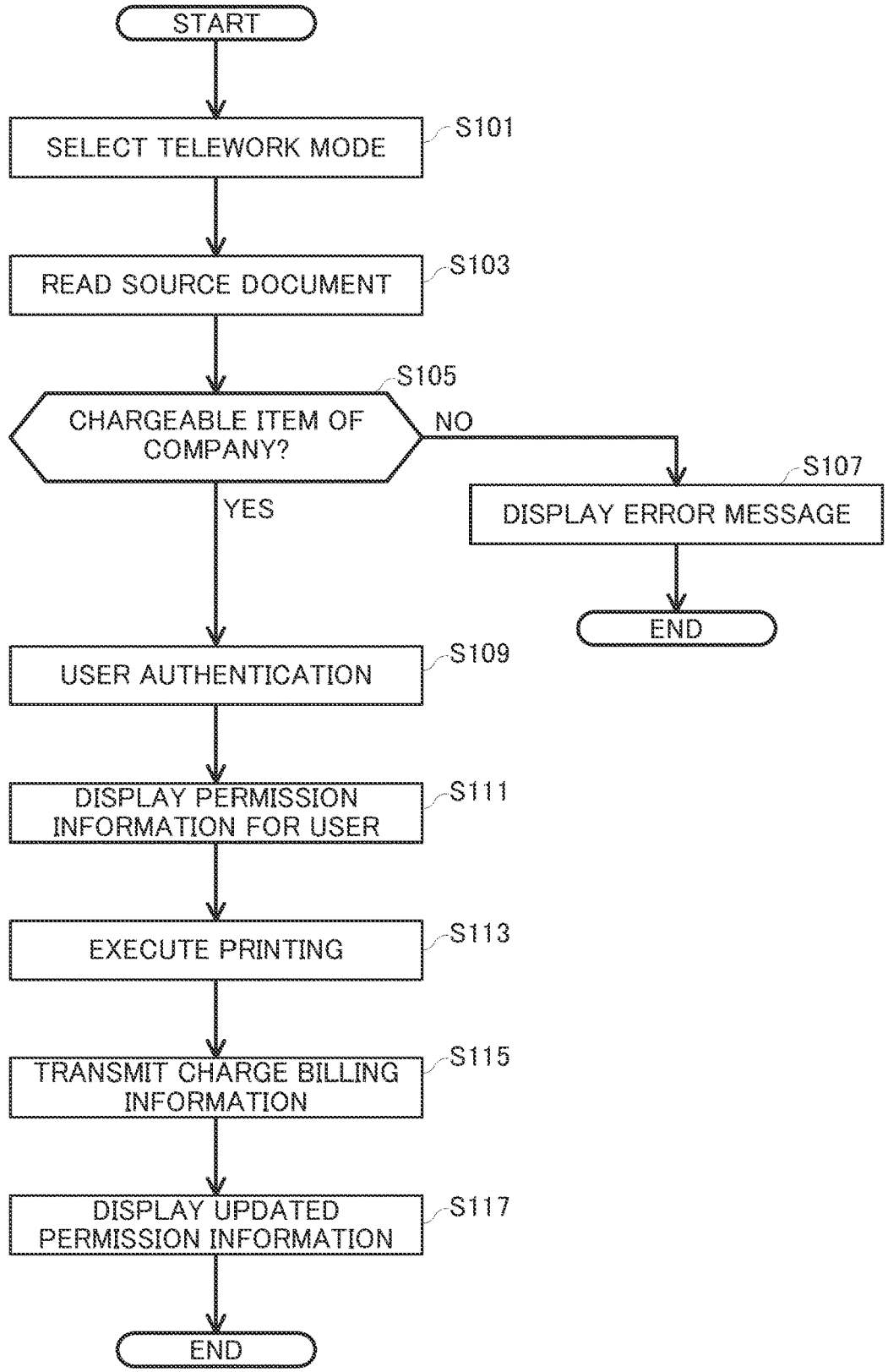
FIG. 5 is a flowchart showing an example of an operation performed by a controller.

Referring now to FIG. 1 to FIG. 5, the charging process performed by the controller 60 will be described hereunder. FIG. 5 is a flowchart showing an example of the operation performed by the controller 60.

Step S101: The controller 60 decides, as shown in FIG. 5, that an instruction to select a telework mode has been inputted, through the operation device 40.

Step S103: The controller 60 causes the reading device 1 to read the image of the source document G, according to the selection instruction. The reading device 1 submits the image data of the source document G, to the controller 60.

Step S105: The controller 60 analyzes the image data submitted from the reading device 1, and decides whether the source document G is a chargeable item of the employing company. The controller 60 decides whether the image data includes the two-dimensional barcode, and further decides whether the two-dimensional barcode includes the image information indicating the permission for charging, when the image data includes the two-dimensional barcode. Upon deciding that the image information is included, the controller 60 decides that the source document G is the chargeable item of the employing company (step S105). Upon deciding that the source document G is the chargeable item of the employing company (Yes at step S105), the controller 60 proceeds to step S109. Upon deciding that the image information indicating the permission for charging is not included in the image data, and that therefore the source document G is not the chargeable item of the employing company (No at step S105), the controller 60 proceeds to step S107.

Step S107: The controller 60 causes the display device 45 to display an error message, and finishes the operation. In this case, the image forming device 4 does not print the image of the source document G.

Step S109: The controller 60 performs the user authentication, on the basis of the user information included in the two-dimensional barcode shown in FIG. 4. When the user information accords with legitimate user information registered in advance, the controller 60 authorizes the user indicated by the user information. Here, even when the user information is acquired from the two-dimensional barcode, the controller 60 may cause the display device 45 to display a message urging the user to also input the password, and authorize the user provided that, further, the password inputted by the user through the operation device 40 accords with the legitimate password registered in advance. In the case where the image information indicating the permission for charging is formed of data other than the two-dimensional barcode, the user authentication may be carried out using an ID card, face authentication, and a password.

Step S111: The controller 60 causes the display device 45 to display permission information for the user (e.g., spending limit), indicated by the user information. The controller 60 transmits the user information to the charging server 11 through the communication device 50, and the charging server 11 transmits the permission information, including the spending limit information of the user indicated by the user information received, to the MFP 10. The controller 60 causes the display device 45 to display the permission information, received through the communication device 50. For example, the employing company specifies a spending limit for each of the users, who are the employees, and the charging server 11 determines the current spending limit, by subtracting the usage fee spent by the time that the user information has been received, from the spending limit specified by the employing company.

Step S113: When the instruction to select the copy service is inputted by the user through the operation device 40, the controller 60 controls the operation of the image forming device 4, so as to print the image data of the source document G acquired through the reading operation by the reading device 1, in other words the image of the source document G. Here, when the instruction to select the data storage service, instead of the copy service, is inputted by the user through the operation device 40, the controller 60 stores the image data of the source document G, in the storage device 70.

Step S115: The controller 60 transmits charge billing information, for charging the printing fee, corresponding to the usage fee incurred from the current use of the printing function, or the storage fee corresponding to the usage fee incurred from the current use of the storage service, to the employing company, to the charging server 11 through the communication device 50. The charge billing information includes the actual amount of money indicating the current printing fee or usage fee. The actual amount of money is calculated by the controller 60, on the basis of the number of printed sheets or the amount of the saved data. Upon receipt of the charge billing information from the MFP 10, the charging server 11 updates the permission information of the user, by overwriting the spending limit at the time that the user information has been received, with the amount of money obtained by subtracting therefrom the amount of money indicated by the charge billing information, thereby determining the latest spending limit. The charging server 11 transmits the updated permission information of the user, to the MFP 10.

Step S117: Upon receipt of the updated permission information through the communication device 50, the controller 60 causes the display device 45 to display the updated permission information of the user. At this point, spending limit information of the user has been updated to the latest status. Upon completing the process of step S117, the controller 60 finishes the operation.

The arrangement according to the foregoing embodiment solves the drawback in that the image forming apparatus is unable to decide whether a source document subjected to the copy service is a chargeable item, for which charging to the company is permitted, and enables the image forming apparatus to decide whether the source document G is the chargeable item. Therefore, when the image data of the source document G, which is the chargeable item, is printed or stored by the MFP 10, the usage fee for the relevant printing or storage service can be properly charged to the employing company.

The embodiment of the disclosure has been described thus far, with reference to the drawings. However, the disclosure is not limited to the foregoing embodiment, but may be implemented in various different manners, without departing from the scope of the disclosure. In addition, a plurality of constituent elements referred to in the foregoing embodiment may be combined as desired, to thereby create various inventions. For example, some of the constituent elements may be excluded, from all of the constituent elements referred to in the embodiment. The drawings schematically illustrate the constituent elements for the sake of clarity, and the number of pieces of the illustrated constituent elements may be different from the actual number, depending on the availability of space on the drawing sheet. Further, the constituent elements referred to in the embodiment are merely exemplary and not specifically limited, and therefore may be modified in various manners, without substantially compromising the advantageous effects of the disclosure.

Although the image forming apparatus according to the embodiment is based on the electrophotography, the disclosure is not limited thereto. The image forming apparatus may be, for example, an ink jet printer.

INDUSTRIAL APPLICABILITY

The disclosure is applicable to the technical field of the image forming apparatus.

While the present disclosure has been described in detail with reference to the embodiments thereof, it would be apparent to those skilled in the art the various changes and modifications may be made therein within the scope defined by the appended claims.

What is claimed is:
1. An image forming apparatus comprising:
   a reading device that reads an image of a source document, and generates image data; and
   a controller that receives an input of the image data generated by the reading device,
   the controller being configured to decide that the source document is a chargeable item, when image information indicating that the source document is the chargeable item, for which charging a usage fee, incurred from utilization of the source document, to a predetermined third party is permitted, is included in the image data,
   the image forming apparatus further comprising a storage device that stores the image data generated by the reading device,
   wherein, in a case where the controller decides that the source document is the chargeable item, on a basis of the image information included in the image data, the controller transmits charge billing information, for charging a storage fee corresponding to the usage fee, to the third party, when the image data is stored in the storage device.

* * * * *